(12) United States Patent
Pan

(10) Patent No.: US 7,766,064 B2
(45) Date of Patent: *Aug. 3, 2010

(54) SHEET LAMINATING APPARATUS HAVING THICKNESS-DETECTING FUNCTION

(75) Inventor: Yung-Tai Pan, Taipei (TW)

(73) Assignee: Primax Electronics Ltd., Taipei (TW)

( * ) Notice: Subject to any disclaimer, the term of this patent is extended or adjusted under 35 U.S.C. 154(b) by 255 days.

This patent is subject to a terminal disclaimer.

(21) Appl. No.: 12/061,006

(22) Filed: Apr. 2, 2008

(65) Prior Publication Data

US 2009/0173447 A1    Jul. 9, 2009

(30) Foreign Application Priority Data

Jan. 4, 2008    (TW) ............................. 97100403 A

(51) Int. Cl.
*B32B 37/00* (2006.01)

(52) U.S. Cl. ...................................................... 156/378
(58) Field of Classification Search ................... 156/378
See application file for complete search history.

(56) References Cited

U.S. PATENT DOCUMENTS 5,160,399 A * 11/1992 Ueda et al. ................... 156/359
6,983,934 B1 * 1/2006 Knierim ........................ 271/262

* cited by examiner

*Primary Examiner*—Kat Wyrozebski
*Assistant Examiner*—Daniel Lee
(74) *Attorney, Agent, or Firm*—Kirton & McConkie; Evan R. Witt

(57) ABSTRACT

The present invention relates to a sheet laminating apparatus having a thickness-detecting function. Before the laminating operation is done, the thickness of the article to be laminated is detected by a thickness detecting mechanism of the sheet laminating apparatus. According to the detected thickness, the temperature or the rotating speed of the heating roller of the sheet laminating apparatus is dynamically adjusted.

7 Claims, 1 Drawing Sheet

SHEET LAMINATING APPARATUS HAVING THICKNESS-DETECTING FUNCTION

FIELD OF THE INVENTION

The present invention relates to a sheet laminating apparatus, and more particularly to a sheet laminating apparatus having a thickness-detecting function.

BACKGROUND OF THE INVENTION

Conventionally, a valuable sheet substance such as a paper sheet or a photograph is usually covered with a protective film for protection because such an article is readily suffered from damage. Typically, a sheet laminating apparatus is used for laminating a sheet substance between two pieces of plastic films.

Generally, the conventional sheet laminating apparatus lacks a thickness detecting mechanism. That is, the laminating operation is done under a predetermined parameter. For example, the temperature and/or the rotating speed of the heating roller are adjusted to a proper level. In a case that the sheet substance is too thick or too thin, the laminating operation is readily suffered from failure. Take a sheet substance having a thickness exceeding the allowable specification for example. If the temperature of the heating roller is insufficient or the rotating speed of the heating roller is too fast, the plastic films are not completely softened and thus the sheet substance fails to bond with the plastic films to form a laminated structure.

Therefore, there is a need of providing a sheet laminating apparatus having a thickness-detecting function for detecting the thickness of the article to be laminated so as to dynamically adjust the temperature and/or the rotating speed of the heating roller of the sheet laminating apparatus.

SUMMARY OF THE INVENTION

It is an object of the present invention to provide a sheet laminating apparatus having a thickness detecting mechanism for detecting the thickness of the article to be laminated. According to the detected thickness, the temperature and/or the rotating speed of the heating roller of the sheet laminating apparatus are dynamically adjusted so that the laminating operation is smoothly performed.

In accordance with an aspect of the present invention, there is provided a sheet laminating apparatus having a thickness-detecting function for detecting an article to be laminated by the sheet laminating apparatus. The sheet laminating apparatus includes an entrance channel, an exit channel, a heating roller and a thickness detecting mechanism. The heating roller assembly is arranged between the entrance channel and the exit channel. The thickness detecting mechanism includes an encoding disc, a rotating shaft, a sensing element, a retractable probe and a cable. The encoding disc is rotated with respect to the center rotating axle line. The rotating shaft is arranged on the encoding disc and aligned with the center rotating axle line. The sensing element is disposed beside the encoding disc for detecting a rotation amount of the encoding disc. The retractable probe is partially embedded into the entrance channel. The cable is wound around the rotating shaft. The cable has a first terminal coupled to the retractable probe and a second terminal coupled to a restorable element.

In an embodiment, the center rotating axle line of the encoding disc pierces through the entrance channel.

In an embodiment, the center rotating axle line of the encoding disc pierces vertically through the entrance channel.

In an embodiment, the thickness detecting mechanism further comprises a pulley, which is coupled to the cable, for changing the direction of a portion of the cable.

In an embodiment, the restorable element is a spring.

In an embodiment, the sensing element is a photo interrupter.

In an embodiment, the retractable probe is pressed down by the article to result in a position shift when the article is fed into the entrance channel, thereby rotating the rotating shaft and the encoding disc.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the prior art, the present invention provides a sheet laminating apparatus having a thickness detecting mechanism.

Figure 1:
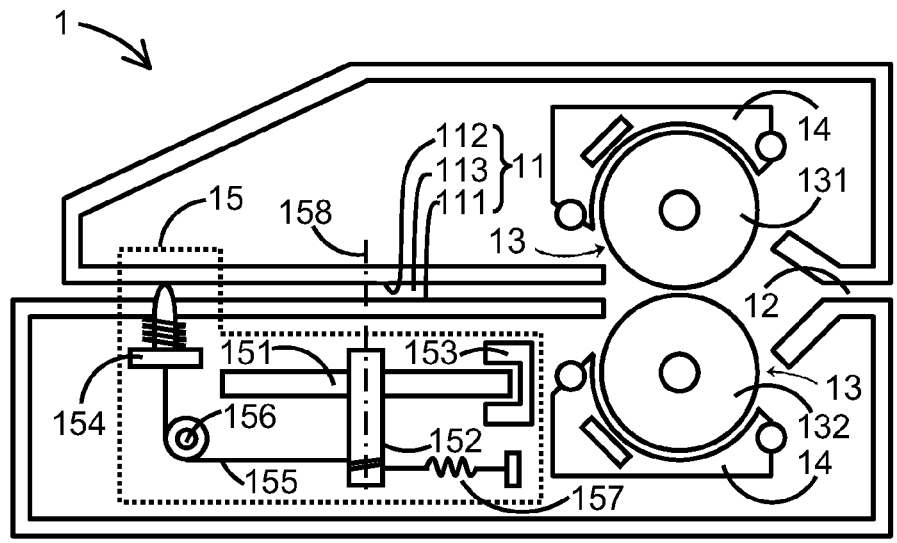
FIG. 1 is a schematic cross-sectional view showing a sheet laminating apparatus according to a preferred embodiment of the present invention.

FIG. 1 is a schematic cross-sectional view showing a sheet laminating apparatus according to a preferred embodiment of the present invention. Hereinafter, the operation principles of the sheet laminating apparatus will be illustrated as follows with reference to FIG. 1.

As shown in FIG. 1, the sheet laminating apparatus 1 principally includes an entrance channel 11, an exit channel 12, a heating roller assembly 13, a heating unit 14 and a thickness detecting mechanism 15. A receiving portion 113 is defined by the lower surface 111 and the upper surface 112 of the entrance channel 11. An article 2 to be laminated by the sheet laminating apparatus 1 should be firstly placed in the receiving portion 113 of the entrance channel 11. In this context, the article 2 to be laminated includes two plastic films and a sheet substance sandwiched between the plastic films. The heating roller assembly 13 includes a pair of adjacent heating rollers 131 and 132, which are arranged between the entrance channel 11 and the exit channel 12. After the sheet laminating apparatus 1 is turned on to perform the laminating operation, the heat generated by the heating unit 14 will be transmitted to the heating rollers 131 and 132. The article 2 fed into the entrance channel 11 is transported and pressed by the heating rollers 131 and 132 so that the sheet substance is bonded with the plastic films to form a laminated structure. The laminated structure is then ejected from the sheet laminating apparatus 1 through the exit channel 12.

Please refer to FIG. 1 again. The thickness detecting mechanism 15 of the sheet laminating apparatus 1 can be used to detect the thickness of the article 2 to be laminated. According to the detected thickness, the temperatures and/or the rotating speeds of the heating rollers 131 and 132 of the sheet laminating apparatus 1 are dynamically adjusted. The thickness detecting mechanism 15 principally includes an encoding disc 151, a rotating shaft 152, a sensing element 153, a retractable probe 154, a cable 155, a pulley 156 and a restorable element 157. In this embodiment, the encoding disc 151 is an optical encoder. The encoding disc 151 has a grating having opaque portions and transparent portions alternately arranged on the rim thereof. The sensing element 153 used in the present invention is for example a photo interrupter, which is disposed beside the encoding disc 151. A straight line connected between the emitter and the receiver of the photo interrupter 153 is perpendicular to the rim of the encoding disc 151. When the encoding disc 151 is rotated with respect to a center rotating axle line 158, the photo interrupter 153 generates a pulse with alternate high level and low level. According to the wave number and the frequency of the pulse, the rotation amounts of the optical disc (e.g. the rotational position and the rotational velocity) are calculated. It is noted that, however, those skilled in the art will readily observe that numerous modifications and alterations may be made while retaining the teachings of the invention. For example, the encoding disc 151 in other embodiments of the sheet laminating apparatus 1 can be a magnetic encoding disc or an electromagnetic encoding disc. The type of the sensing element 153 is varied according to the encoding disc 151. In addition to the complete circular shape, the shape of the encoding disc 151 can be varied as required. For example, the encoding disc 151 may have a fan-shape or an arbitrary shape as long as the encoding disc 151 is rotated with respect to a center rotating axle line 158 and the rotation amounts of the encoding disc 151 is detectable by the sensing element 153.

Please refer to FIG. 1 again. In the thickness detecting mechanism 15 of the sheet laminating apparatus 1, the encoding disc 151 is preferably parallel to the horizon or slightly tilted. Accordingly, the center rotating axle line 158 of the encoding disc 151 pierces through the lower surface 111 of the entrance channel 11. For generating a more precise sensing signal from the sensing element 153, the diameter of the encoding disc 151 inside of the sheet laminating apparatus 1 can be increased. Moreover, since the encoding disc 151 is parallel to the horizon without increasing the height of the sheet laminating apparatus 1, the sheet laminating apparatus 1 has slim appearance. In this embodiment, the encoding disc 151 is parallel to the horizon and the center rotating axle line 158 of the encoding disc 151 pierces through the lower surface 111 of the entrance channel 11. In some embodiments, the encoding disc 151 may by tilted with a tilt angle small than 45 degrees provided that the center rotating axle line 158 of the encoding disc 151 pierces through the lower surface 111 of the entrance channel 11.

Please refer to FIG. 1 again. In the thickness detecting mechanism 15 of the sheet laminating apparatus 1, the rotating shaft 152 is arranged on the encoding disc 151 and aligned with the center rotating axle line 158. As a consequence, the rotating shaft 152 is synchronously rotated with the encoding disc 151. The retractable probe 154 is partially embedded into the entrance channel 11. When the article 2 is fed into the entrance channel 11, the retractable probe 154 is pressed down by the article 2 to result in a position shift. In the thickness detecting mechanism 15 of the sheet laminating apparatus 1, the position shift of the retractable probe 154 is converted into the rotation amount of the encoding disc 151. One terminal of the cable 155 is coupled to the retractable probe 154. The other terminal of the cable 155 is partially wound around the rotating shaft 152 and then coupled to the restorable element 157.

Figure 2:
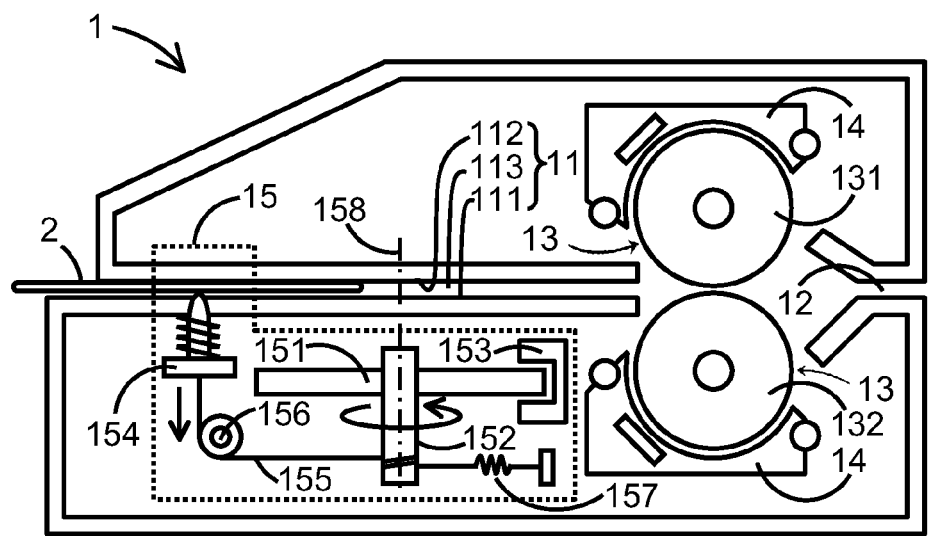
FIG. 2 is a schematic cross-sectional view illustrating operations of the thickness detecting mechanism of the sheet laminating apparatus according to a preferred embodiment of the present invention.

When the article 2 is inserted into the receiving portion 113 of the entrance channel 11, as shown in FIG. 2, the retractable probe 154 is pressed down by the article 2 to result in a position shift. According to the position shift of the retractable probe 154, the rotating shaft 152 wound by the rotating shaft 152 is subject to rotation while the sensing element 153 synchronously detects the rotation amount of the encoding disc 151. The thickness of the article 2 is calculated according to the rotation amount of the encoding disc 151. According to the detected thickness, the temperatures and/or the rotating speeds of the heating rollers 131 and 132 of the sheet laminating apparatus 1 are dynamically adjusted.

In this embodiment, the restorable element 157 is a spring or another equivalent to a spring in order to offer sufficient tension of the cable 155. Since the encoding disc 151 is parallel to the horizon or slightly tilted, the sheet laminating apparatus 1 needs at least one pulley 156 to adjust the direction of the cable 155 such that the position shift of the retractable probe 154 can be converted into the rotation amount of the encoding disc 151. In the embodiment of FIG. 2, the retractable probe 154 is moved in the vertical direction. Alternatively, the retractable probe 154 may be swung like a swing arm as long as the swing amount of the retractable probe 154 can be converted into the rotation amount of the encoding disc 151 so to calculate the thickness of the article 2.

In the above embodiments, the heating rollers 131 and 132 of the sheet laminating apparatus 1 are driven by a driving mechanism including a motor and a gear. Moreover, those skilled in the art will readily observe that numerous modifications of adjusting the rotating speeds of the heating rollers 131 and 132 may be made while retaining the teachings of the invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sheet laminating apparatus having a thickness-detecting function for detecting an article to be laminated by said sheet laminating apparatus, said sheet laminating apparatus comprising:
    an entrance channel;
    an exit channel;
    a heating roller assembly arranged between said entrance channel and said exit channel; and
    a thickness detecting mechanism comprising:
        an encoding disc rotated with respect to a center rotating axle line;
        a rotating shaft arranged on said encoding disc and aligned with said center rotating axle line;
        a sensing element disposed beside said encoding disc for detecting a rotation amount of said encoding disc;
        a retractable probe partially embedded into said entrance channel; and
        a cable wound around said rotating shaft, wherein said cable has a first terminal coupled to said retractable probe and a second terminal coupled to a restorable element, wherein a position shift of said retractable probe is converted into said rotation amount of said encoding disc.

2. The sheet laminating apparatus having a thickness-detecting function according to claim 1 wherein said center rotating axle line of said encoding disc pierces through said entrance channel.

3. The sheet laminating apparatus having a thickness-detecting function according to claim 2 wherein said center rotating axle line of said encoding disc pierces vertically through said entrance channel.

4. The sheet laminating apparatus having a thickness-detecting function according to claim 1 wherein the thickness detecting mechanism further comprises a pulley, which is coupled to said cable, for changing the direction of a portion of said cable.

5. The sheet laminating apparatus having a thickness-detecting function according to claim 1 wherein said restorable element is a spring.

6. The sheet laminating apparatus having a thickness-detecting function according to claim 1 wherein said sensing element is a photo interrupter.

7. The sheet laminating apparatus having a thickness-detecting function according to claim 1 wherein said retractable probe is pressed down by said article to result in a position shift when said article is fed into said entrance channel, thereby rotating said rotating shaft and said encoding disc.

* * * * *